United States Patent
Breining et al.

(10) Patent No.: US 8,346,809 B2
(45) Date of Patent: Jan. 1, 2013

(54) QUERYING MARKUP LANGUAGE DATA SOURCES USING A RELATIONAL QUERY PROCESSOR

(75) Inventors: Martin Breining, San Jose, CA (US); Vanja Josifovski, Los Gatos, CA (US); Peter M. Schwarz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/048,304

(22) Filed: Mar. 15, 2011

(65) Prior Publication Data
US 2011/0208774 A1 Aug. 25, 2011

Related U.S. Application Data

(62) Division of application No. 11/769,323, filed on Jun. 27, 2007, now Pat. No. 7,925,668, which is a division of application No. 10/141,921, filed on May 10, 2002, now Pat. No. 7,457,810.

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 5,564,113 A | 10/1996 | Bergen et al. | |
| 6,076,092 A | 6/2000 | Goldberg et al. | |
| 6,128,617 A * | 10/2000 | Lowry | 1/1 |
| 6,598,015 B1 | 7/2003 | Peterson et al. | |
| 6,704,723 B1 | 3/2004 | Alavi | |
| 6,799,184 B2 | 9/2004 | Bhatt et al. | |
| 6,901,410 B2 | 5/2005 | Marron et al. | |
| 7,444,330 B2 | 10/2008 | Bernstein et al. | |
| 2001/0047372 A1 | 11/2001 | Gorelik et al. | |
| 2002/0019824 A1 | 2/2002 | Holder et al. | |
| 2002/0116371 A1 | 8/2002 | Dodds et al. | |
| 2002/0120630 A1* | 8/2002 | Christianson et al. | 707/103 R |
| 2002/0133497 A1 | 9/2002 | Draper et al. | |
| 2002/0194149 A1 | 12/2002 | Gerber et al. | |
| 2011/0040794 A1 | 2/2011 | Breining et al. | |

FOREIGN PATENT DOCUMENTS
WO  WO 00/56033  9/2000
(Continued)

OTHER PUBLICATIONS

Cheng et al., IBM DB2 XML Extender—An end-to-end solution for storing and retrieving XML documents, IEEE, Feb. 2000, pp. 1-9.

(Continued)

*Primary Examiner* — Isaac M Woo
(74) *Attorney, Agent, or Firm* — Sughrue Mion, PLLC

(57) ABSTRACT

An XML wrapper queries an XML document in an on-the-fly manner so that only parent nodes in the document that satisfy the query are extracted and then unnested. The parent nodes and associated descendent nodes are located using XPath expressions contained as options in data definition language (DDL) statements. The parent nodes satisfying the query and associated descendent nodes are extracted and stored outside of a database according to a relational schema. The wrapper facilitates applications that use convention SQL queries and views to operate on that information stored according to the relational schema. The wrapper also responds to query optimizer requests for costs associated with queries against external data sources associated with the wrapper.

21 Claims, 13 Drawing Sheets

FOREIGN PATENT DOCUMENTS

WO    WO 00/75849    12/2000

OTHER PUBLICATIONS

Lin et al, Object-Oriented Mediator Queries to XML Data, IEEE, 2000, pp. 39-46.

NeoCore Resource Document, An Xpath Primer, Release 1.1. Oct. 12, 2001, pp. 1-38.

Sahuguet, et al., Building Light-weight Wrappers for Legacy Web Data-Sources Using W4F, Sep. 1999, pp. 738-741.

XML Path Language (Xpath), http:/www.w3org/TR/1999/REC-xpath-19991116, Version 1.0, W3C Recommendation Nov. 16, 1999, pp. 1-40.

U.S. Appl. No. 11/769,323, filed Jun. 27, 2007, which is the parent application of the present application.

U.S. Appl. No. 10/141,921, filed May 10, 2002, which is the parent of U.S. Appl. No. 11/769,323 and issued as U.S. Patent No. 7,457,810.

U.S. Appl. No. 11/837,567, filed Aug. 13, 2007, which is a divisional of U.S. Appl. No. 10/141,921 and issued as Patent No. 7,844,629.

U.S. Appl. No. 12/915,368, filed Oct. 29, 2010, which is a divisional of U.S. Appl. No. 11/837,567.

U.S. Appl. No. 12/239,308, filed Sep. 29, 2008, which is a continuation of U.S. Appl. No. 10/141,921.

Bourret, R., Xpath in Five Paragraphs, http:/www.rpbourrett.com/xml/Xpathin5.htm, Nov. 2001.

Cheng et al., IBM DB2 XML Extender—An end-to-end solution for storing and retrieving XML documents, IEEE, Fef. 2000, pp. 1-9.

Gardarin, G., et al., XML-based Components for Federating Multiple Heterogeneous Data Sources, Nov. 1999, pp. 500-519.

Lacroix, Building Portals for E-Blology, IEEE, 2001, pp. 41-49.

Lacroix, Scientific Data Integration: Wrapping Textual Documents with a Database View Mechanism and an XML Engine, IEEE, 2000, pp. 71-76.

\* cited by examiner

MAPPING AN XML HIERARCHY TO TABLES

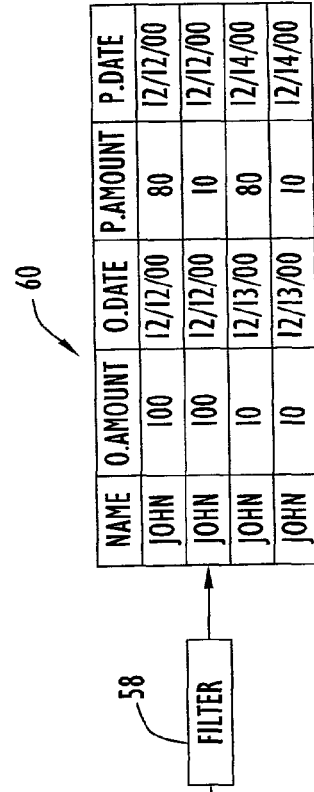

48a — <CUSTOMER NAME='JOHN', CITY='SAN JOSE'/>
50a — <ORDER AMOUNT='100', DATE='12/12/00'/>
50b — <ORDER AMOUNT='10', DATE='12/13/00'/>
52a — <PAYMENT AMOUNT='80', DATE='12/12/00'/>
52b — <PAYMENT AMOUNT='10', DATE='12/14/00'/>
54a — <CUSTOMER/>
48b — <CUSTOMER NAME='TED', CITY='MONTEREY'/>
50c — <ORDER AMOUNT='5', DATE='12/14/00'/>
50d — <ORDER AMOUNT='10', DATE='12/15/00'/>
52c — <PAYMENT AMOUNT='5', DATE='12/15/00'/>
52d — <PAYMENT AMOUNT='5', DATE='12/16/00'/>
54b — <CUSTOMER/>

| C.NAME | C.CITY | O.AMOUNT | O.DATE | P.AMOUNT | P.DATE |
|--------|--------|----------|--------|----------|--------|
| JOHN | SAN JOSE | 100 | 12/12/00 | 80 | 12/12/00 |
| JOHN | SAN JOSE | 100 | 12/12/00 | 10 | 12/12/00 |
| JOHN | SAN JOSE | 10 | 12/13/00 | 80 | 12/14/00 |
| JOHN | SAN JOSE | 10 | 12/13/00 | 10 | 12/14/00 |
| TED | MONTEREY | 5 | 12/14/00 | 5 | 12/15/00 |
| TED | MONTEREY | 5 | 12/14/00 | 5 | 12/15/00 |
| TED | MONTEREY | 10 | 12/15/00 | 5 | 12/16/00 |
| TED | MONTEREY | 10 | 12/15/00 | 5 | 12/16/00 |

58 — FILTER

60

| NAME | O.AMOUNT | O.DATE | P.AMOUNT | P.DATE |
|------|----------|--------|----------|--------|
| JOHN | 100 | 12/12/00 | 80 | 12/12/00 |
| JOHN | 100 | 12/12/00 | 10 | 12/12/00 |
| JOHN | 10 | 12/13/00 | 80 | 12/14/00 |
| JOHN | 10 | 12/13/00 | 10 | 12/14/00 |

FIG.4B

SELECT C.NAME, C.ADDRESS, O.DATE
FROM CUSTOMER C, ORDER O, PAYMENT P
WHERE O.DATE=P.DATE AND
  C.NAME='JOHN' AND
  C.CID=O.CID AND C.CID=P.CID AND
  P.AMOUNT>O.AMOUNT AND
  P.DATE=O.DATE;

FIG.4C

```
74 — CREATE WRAPPER XML LIBRARY 'LIBXML.A'
76 — CREATE SERVER XML_CUSTOMERS WRAPPER XML;

78 — CREATE NICKNAME CUSTOMER

80a —— NAME      VARCHAR(16)      OPTIONS(XPATH './/NAME'),
80b —— ADDRESS   VARCHAR(30)      OPTIONS(XPATH './/ADDR/@STREET'),
80c —— CID       VARCHAR(16)      OPTIONS(XPATH '@CID', PRIMARY_KEY 'Y'))
       FOR SERVER XML_CUSTOMERS
82 — OPTIONS(XPATH    '//CUSTOMER'
             FILE_PATH 'C:/BIO_DATA/SEQUENCES.XML');

84 — CREATE NICKNAME ORDER
  86a — (AMOUNT VARCHAR(20)      OPTIONS(XPATH './AMOUNT'),
  86b —— DATE   VARCHAR(10)      OPTIONS(XPATH './DATE'),
  86c — OID     VARCHAR(16)      OPTIONS(PRIMARY_KEY 'Y'),
  86d —— CID    VARCHAR(16)      OPTIONS(FOREIGN_KEY 'Y'))
       FOR SERVER XML_CUSTOMERS
88 — OPTIONS (XPATH    './/ORDER',
              PARENT 'CUSTOMER');

90 — CREATE NICKNAME ITEMS
  92a — (ITEM_NAME   VARCHAR(20)   OPTIONS(XPATH './NAME'),
  92b —— QUANTITY    INTEGER       OPTIONS(XPATH '@QUANT'),
  92c — OID          VARCHAR(16)   OPTIONS(FOREIGN_KEY 'ORDER'),
       FOR SERVER XML_SERVER
94 — OPTIONS (XPATH    './/ITEM',
              PARENT 'ORDER');
```

FIG.7A

74 —— CREATE WRAPPER XML LIBRARY 'LIBXML.A'
76 —— CREATE SERVER XML_CUSTOMERS WRAPPER XML;

78 —— CREATE NICKNAME CUSTOMER
    96 ——(DOCUMENT XMLDOCUMENT    OPTIONS(DOCUMENT 'FILE'),
    80a —— NAME    VARCHAR(16)    OPTIONS(XPATH './/NAME'),
    80b —— ADDRESS    VARCHAR(30)    OPTIONS(XPATH './/ADDR/@STREET'),
    80c —— CID    VARCHAR(16)    OPTIONS(XPATH '@CID', PRIMARY_KEY 'Y'))
    FOR SERVER XML_CUSTOMERS

SELECT C.NAME, O.AMOUNT
FROM CUSTOMER C, ORDER O
100 —— WHERE C.DOCUMENT='/HOME/VANJA/CUSTOMERS.XML' AND
        C.CID=O.CID AND
        O.DATE='12/12/01';

FIG.7B

SELECT C.NAME, O.AMOUNT
FROM CUSTOMER C, ORDERS O
WHERE C.CID = O.CID;

126 ⟶ CREATE FEDERATED VIEW ORDER AS
SELECT O.AMOUNT, O.DATE, O.OID, C.CID
FROM CUSTOMER C, ORDER_1 O
WHERE C.CID = O.CID;

128 ⟶ CREATE FEDERATED VIEW PAYMENT AS
SELECT P.AMOUNT, P.DATE, C.CID
FROM CUSTOMER C, PAYMENT_1 P
WHERE C.CID = P.CID;

130 ⟶ CREATE FEDERATED VIEW ITEM AS
SELECT IT.QUANTITY, IT.NAME, O.OID
FROM CUSTOMER C, ORDER_1 O, ITEM_1 I
WHERE C.CID = O.CID AND O.OID = I.OID

FIG.11

SELECT O.AMOUNT, P.AMOUNT
FROM ORDER O, PAYMENT P
WHERE P.DATE = O.DATE AND P.CID = O.CID

FIG.12A

SELECT O.AMOUNT, P.AMOUNT
FROM CUSTOMER C1, PAYMENT_1 P, CUSTOMER C2, ORDER_1 O
WHERE P.DATE = O.DATE AND P.CID = O.CID AND C1.CID = P.CID AND C2.CID = O.CID;

FIG.12B

```
SELECT O.AMOUNT, P.AMOUNT
FROM  CUSTOMER C, PAYMENT_1 P, ORDER_1 O
WHERE P.CID = C.CID AND O.CID = C.CID AND P.DATE = O.DATE
```

FIG.12C

```
SELECT C.NAME, O.AMOUNT
FROM CUSTOMER C, ORDER O
WHERE C.CID = O.CID
```

FIG.13A

```
SELECT C1.NAME, O.AMOUNT
FROM CUSTOMER C1, CUSTOMER C2, ORDER_1 O
WHERE C1.CID = C2.CID AND C1.CID = O.CID;
```

FIG.13B

```
SELECT C1.NAME, O.AMOUNT
FROM CUSTOMER C, ORDER_1 O
WHERE C.CID = O.CID;
```

FIG.13C

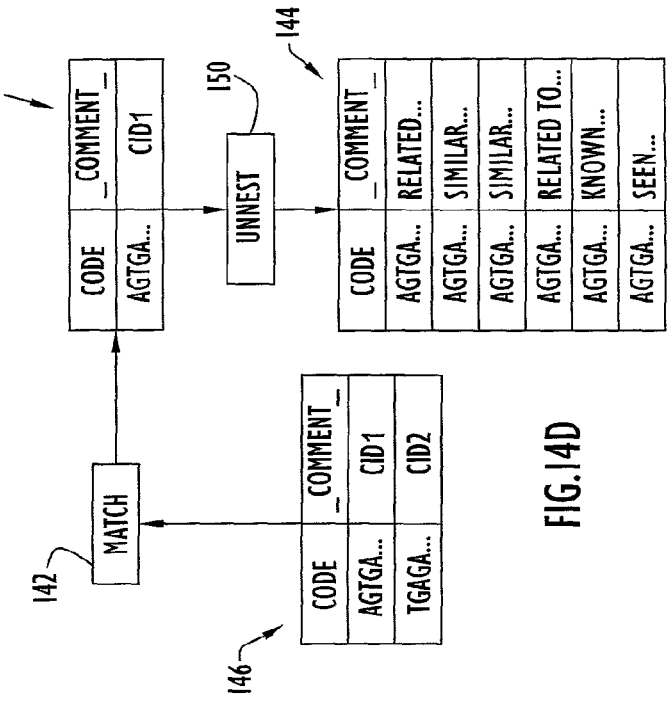

QUERYING MARKUP LANGUAGE DATA SOURCES USING A RELATIONAL QUERY PROCESSOR

This is a divisional of application Ser. No. 11/769,323 filed Jun. 27, 2007, which is a divisional of Ser. No. 10/141,921 filed May 10, 2002. The entire disclosures of the prior applications, application Ser. Nos. 11/769,323 and 10/141,921, are hereby incorporated by reference.

BACKGROUND OF THE INVENTION

1. Field of the Invention

The invention relates to information storage and retrieval systems, methods and articles of manufacture. More particularly, it relates to handling information contained in a markup language document using database tools and techniques.

2. Description of the Related Art

The Extensible Markup Language (XML) is a type of markup language using tags to designate data. XML was created as a data exchange and representation standard that provides techniques for storing complex data structures in a hierarchical manner and in a way suitable for exchange over the Internet. An XML document can be a file or a data stream containing nested elements, or nodes, starting with a root node. Nested below the root node, in a hierarchical fashion, such as in a parent-child relation, are other nodes. Nested below those other nodes can be further nested nodes.

Methods of integrating XML data with other data generally fall into two groups. In one group, the XML data is copied from its original location and stored, persistently, in a centralized database. In the other group, the XML data is brought to the centralized database only in response to specific application requests and is stored persistently outside the centralized database, in one or more external stores. There are various tradeoffs between the two approaches. The second approach has certain advantages over the first, including 1) avoiding the need to replicate in the centralized database special functionality of backend sources of the XML data, and 2) having current data found in response to queries, since that data comes directly from the source. However, with both of those conventional approaches the entire XML schema is mapped to a single table, and accordingly, the output from the XML source is flat. When the XML data is flattened into a single table, data values can be repeated in many tuples. For example, in an XML document holding information concerning customer names and orders they place, when the XML data is flattened into a single table a customer name will appear with every order associated with the customer, thereby repeating the customer name many times.

With either of these conventional approaches the XML schema is mapped into a flat space prior to a query operating on the XML information. All the data requested by the query must pass through the database management system, and with the data flattened into a single table this can be a large volume of data due to the repeating information. Such a flat mapping operation can be expensive in that it can take a long time to map the data into the flat space, and in the process can consume a large amount of memory. Further, the number of operations performed over the XML data values is increased because those operations must be performed over the repeating data values in the single table. Further still, with the data flattened into a single table, a query optimizer cannot be used to unnest the nested XML elements in a just-in-time manner.

Accordingly, there is a need to extract XML data from a data source into a plurality of tables in a just-in-time manner to reduce the volume of data that must pass through a database management system.

SUMMARY OF THE INVENTION

Methods are described here of querying data in a mark-up language document stored in a data source, in which the mark-up language document, such as an XML document, contains a plurality of nodes. These methods include a wrapper receiving, in response to a request to extract a node from the markup language document, a data stream including a parent node, and evaluating the parent node with respect to a query. In response to evaluating the query, the wrapper requests one or more nodes in a nested relationship with the parent node if the parent node satisfies the query. The wrapper maps the data stream according to a relational schema into a plurality of tables buffered in a non-persistent memory. The wrapper translates the query into the request to extract the node from the document by evaluating an expression, such as an XPath expression, for locating the parent node.

Another method described here involves querying a document, such as an XML document, that contains hierarchical information, including includes parent and child nodes. A wrapper locates a first parent node in the document by using a mapping specification. If the first parent node satisfies a query the first parent node is stored in a first table. Nested child nodes relating to the first parent node are fetched from the document and stored in a second table in response to determining that the first parent node satisfies the query. Other parent nodes that satisfy the query are stored in the first table, and the nested child nodes relating to these other parent nodes are fetched from the document. The fetched child nodes are stored in a second table, wherein the nested child nodes are located by using the mapping specification.

Also described here is a computer based system for querying a markup language document, such as an XML document. The system includes a data source configured to manage the markup language document and a wrapper unit configured to extract information from the XML document in response to a query. The wrapper extracts the information by consulting a mapping specification containing information for locating the parent node. The wrapper further extracts the parent node and determines if the parent node satisfies the query. If the parent node satisfies the query that node is stored in a first table prior to extracting another parent node. Only the children nodes of parent nodes stored in the first table are extracted by consulting the mapping specification, and those nodes are stored in a second table. The first and second tables are buffered in non-persistent storage.

Another method described here optimizes a query of information in a markup language document that is stored in a data source external to a database. The method includes a wrapper associated with the data source containing the markup language document, such as an XML document, receiving a request for information concerning a cost of a query against the data source. In response to the request the wrapper determines a cost of performing the query, and responds to the request by providing information concerning the cost.

Features and advantages of the invention will become apparent upon consideration of the following descriptions and descriptive figures of specific embodiments thereof. While these descriptions go into specific details, it should be

BRIEF DESCRIPTION OF THE DRAWINGS

FIG. 4A shows a portion of the information in an XML document.

FIG. 4B illustrates a conventional early flattening of the information in the XML document of FIG. 4A, with the information from that XML document stored in a relational database.

FIG. 4C shows an SQL query fragment applied to the information shown in FIG. 4B.

FIGS. 7A and 7B show examples of data definition language (DDL) representations employed by a wrapper, specifying the relational mapping of the XML data.

FIG. 11 shows three SQL view definitions.

FIGS. 12A through 12C show an SQL query submitted by a client, and subsequent generations of the query generated by an SQL optimizer.

FIGS. 13A through 13C show another example of an SQL query submitted by a client, and subsequent generations of the query generated by an SQL optimizer.

FIGS. 14A through 14D show another example of late flattening when applied to an expensive database match operation.

DETAILED DESCRIPTION

Figure 1:
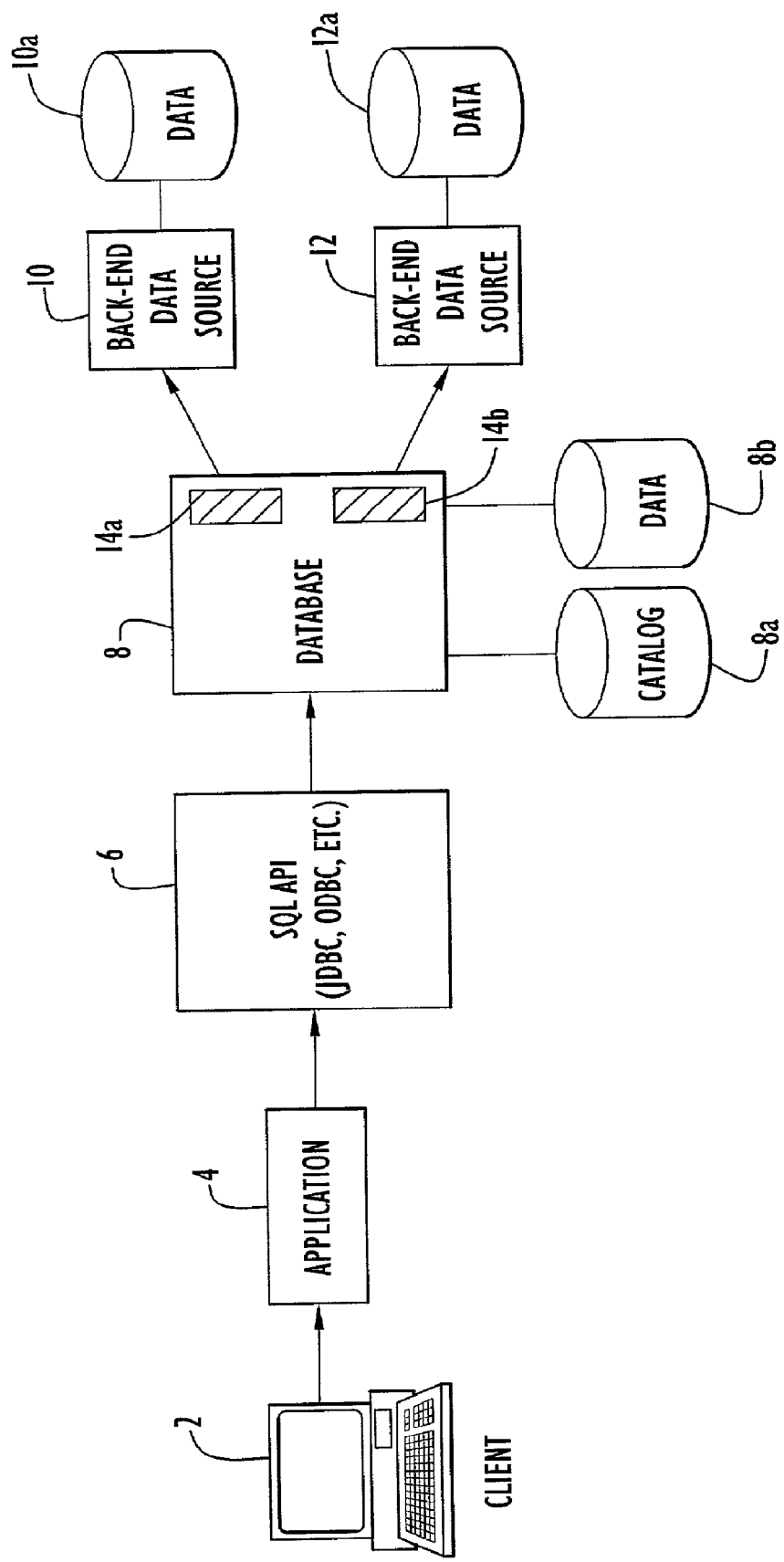
FIG. 1 shows a federated database architecture employing wrappers to handle data sources containing a markup language document, such as an Extensible Markup Language (XML) document.

The embodiments described below are described with reference to the above drawings, in which like reference numerals designate like components.

A wrapper is described here for use with a relational database system to map hierarchical data contained in a markup language document, located in a source external to the database, into a relational schema composed of a set of tables. An example of such a markup language document is an Extensible Markup Language (XML) document. The XML wrappers described here enable use of conventional database languages, such as the Structured Query Language (SQL), to query external XML documents stored in files or in other locations such as the database. The wrappers can provide read-only access to XML documents.

An XML document contains elements, or nodes, related to one another in a hierarchical manner. The wrappers described here map certain elements in the XML document into a relational schema composed of a set of tables, or nicknames. A federated database is a distributed computing system that includes a database management system server with one or more local databases and one or more external data sources. A nickname is a name given to a table in a federated database that is stored by one of the data sources in the federation. Clients refer to the table by this nickname without having to specify the data source name. A nickname is like a pointer to a table with which a server in the federated database refers the actual database object.

XML Path Language (XPath) expressions, specified as options, can be used to locate nodes within the XML document. XPath is a language for addressing parts of an XML document and XPath expressions are described in XML Path Language (XPath), Version 1.0, W3C Recommendation, Nov. 16, 1999, located at http://www.w3.org/TR/xpath. Each table for the XML document is defined by an XPath expression that identifies the XML elements representing individual tuples, or rows in a relational table, and a set of XPath expressions specifying how to extract the column values from each element. Nested XML elements can be represented by separate views relating to the outer views by using primary/foreign keys that are either extracted from the document or generated by the system. By employing the wrappers described here, SQL applications, existing SQL generation tools and available SQL trained programmers can be leveraged for processing XML data without need to materialize, or move, the data into a database.

Architecture

A federated database architecture employing such an XML wrapper is shown in FIG. 1. A client 2, running an application 4 that requires information communicates through an SQL application programming interface (API) 6 with a relational database system 8 to request that information. The SQL API can include, for example, a Java Database Connectivity (JDBC) API, an Open Database Connectivity (ODBC) API, or other well known APIs. In a preferred embodiment, the DB2® database marketed by International Business Machines, Corp. (IBM(®), is used as the relational database, which includes a catalog 8a and a data storage area 8b. Coupled to the backend of the database are data sources 10 and 12, each containing data storage areas 10a and 12a, respectively. Operating in conjunction with the database 8 are wrappers 14a and 14b that operate to map the hierarchical data in the XML document into relational tables. Although the wrapper is described here for use with the IBM DB2® relational database management system (DBMS), the XML wrapper can be used with other DBMSs.

The XML wrappers 14a or 14b retrieve data from one or more of the XML data sources on-demand without materializing it, or storing it in the database. The wrapper reads the data from a stream produced as a result of a parameterized call, such as a Simple Object Access Protocol (SOAP) call, or user written program code that accesses the data sources. Application 4 can use SQL to query the external XML data without being aware of its origin and original format. This paradigm enables reuse of legacy SQL applications, as well as leverages existing SQL generation tools and available SQL trained programmers for development of new SQL applications operating on XML data. The XML tables can be used in user queries in the same manner as other tables. Queries can combine data from several XML and non-XML data sources with data stored locally in the relational database. A query processor within the DBMS breaks the queries into fragments for the individual sources and produces an efficient execution plan using cost estimates supplied by the XML wrapper. The planning phase allows for plans, where the nested repeating elements in the XML documents are unnested into tuples, or rows in a relational table, in a just-in-time manner to reduce the number of processed tuples and lower the query execution time.

A structure of an XML document is logically similar to a relational schema where the nested and the repeating elements are modeled as separate tables with foreign keys. Mapping XML data to a single relational table, as is done in some conventional methods, has similar deficiencies as using one denormalized table to model all the data represented by a schema. The tables, or nicknames, corresponding to an XML document are organized into a tree where the child nicknames model elements that are nested in the element corresponding to the parent nickname. There are basically two cases when an nested element should be modeled as a separate nickname: 1) repeating elements; and 2) elements with distinct identity and rich structure.

Figure 2A:
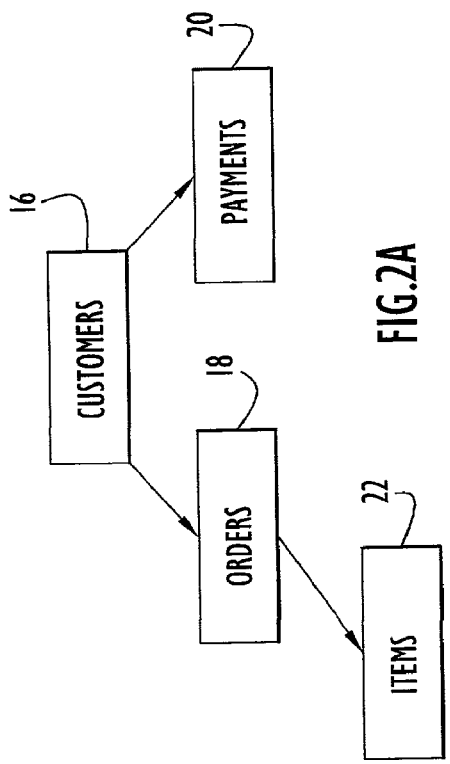
FIG. 2A illustrates a hierarchical information structure employed in an XML document.

FIG. 2A shows a hierarchical tree representation of information contained in an example XML document. Here, the XML document includes customer information 16, shown as the root of a tree structure in FIG. 2A, order information 18, and payment information 20. Both the order and payment information are children of the customer information. Information concerning the items 22 that have been ordered are children of the order information. If this example document is mapped to a single nickname or table, as in conventional systems, then in order to preserve the information, each tuple, or row, would contain the customer information as well as one order and one payment. Such a flattening of the XML information leads to a large number of rows in the database, each repeating the customer name and address information. A better model is to map each entity into a separate nickname or table.

Figure 2B:
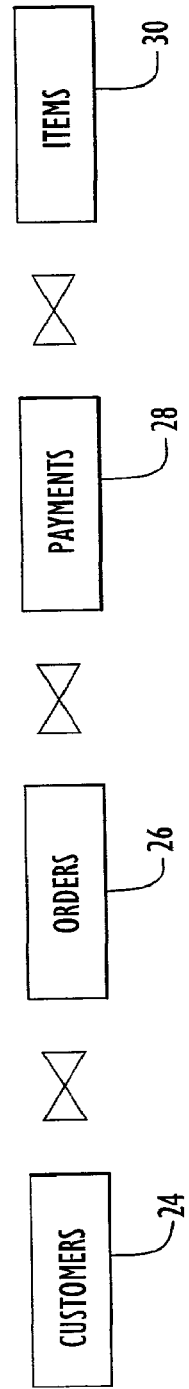
FIG. 2B illustrates the hierarchical XML structure of FIG. 2A, mapped into a relational schema.

The wrapper identifies selected repeating elements or elements with distinct identity and rich structure, and maps that information into a plurality of related tables held in non-persistent storage. FIG. 2B shows the nickname information of FIG. 2A mapped into four separate tables, namely a customer table 24, an order table 26, a payment table 28 and an item table 30.

Figure 3:
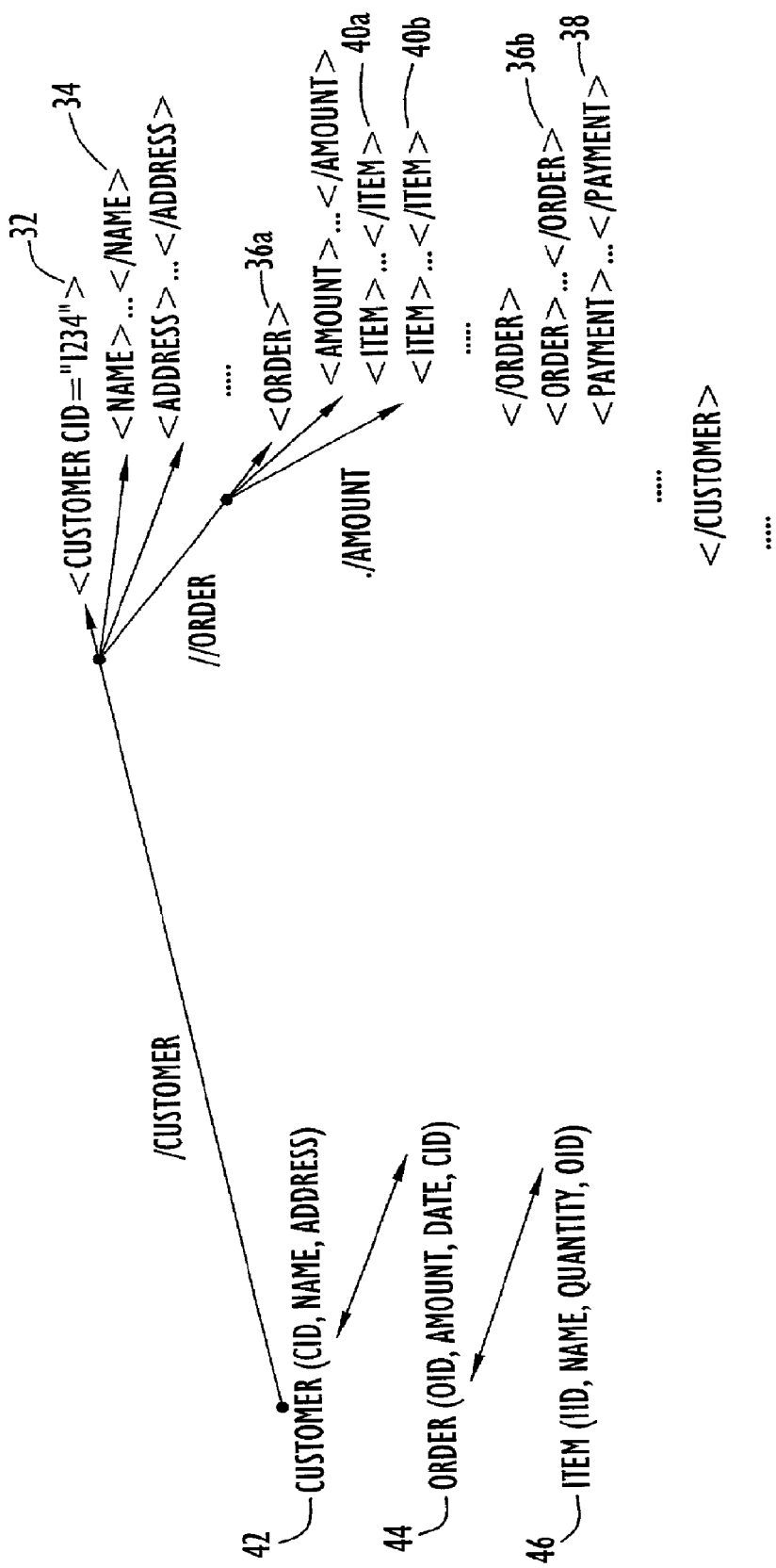
FIG. 3 illustrates another representation of the hierarchical XML information structure mapped into a relational schema in which nested repeating entries are mapped to separate tables.

An example of a portion of an XML document is shown on the right-hand side of FIG. 3. The left-hand side of FIG. 3 shows table names, corresponding to the nicknames, and lists the columns within those tables. The wrapper maps the information in the XML document to the tables as shown in FIG. 3. Here, the customer element 32, corresponding to a root node, its location indicated by "/customer," is mapped to a customer table 42 having columns for a customer ID (CID), a name, and an address. The CID column operates as a primary key for the customer table. Nested within the customer element are order elements 36a and 36b. These elements are mapped to an order table 44, having columns for an order ID (OID), which operates as a primary key for the order table, an amount of the order, the date the order was placed, and a foreign key, namely, the CID for the customer thereby relating the order to a customer entry in the customer table. Since the order elements are children of the customer element, their location is indicated as "//order." The amount element, for example, is a leaf node in the hierarchical XML tree, and its location is indicated as "./amount" indicating that the element is present below the current node, in this case an order node. Nested within the order elements are item elements 40a and 40b. These elements are mapped into an item table 46, having columns for an item id (iid) which operates as a primary key, an item name, a quantity of the item in the order, and a foreign key, namely the order ID (OID), thereby relating the item to an order in the order table. By mapping selected portions of the XML hierarchical tree structure into a plurality of relational tables held in non-persistent memory, the XML data can be operated on in real time, or "on-the-fly," using conventional database queries and tools.

Each nickname that is mapped into a separate table is defined in the wrapper by an XPath expression that identifies the XML elements representing individual tuples, and a set of XPath expressions specifying how to extract the column values from each element.

Overview

FIGS. 4A through 4C illustrate a conventional early flattening technique for mapping XML information into a single table. FIG. 4A illustrates a portion of an XML document containing records for two customers, John and Ted. The document includes XML node 48a defining the customer name for John as well as his location. Nodes 50a and 50b contain information concerning two orders for the customer, John. Nodes 52a and 52b contain information concerning payments made by the customer, John. Tag 54a ends the record for customer John. Similarly, the record for Ted includes node 48b with the customer name, Ted, nodes 50c and 50d containing information about orders placed by Ted, and nodes 52c and 52d with information concerning payments made by Ted. Tag 54b terminates the customer record for Ted.

In a conventional method for handling XML documents, the information within the XML document is extracted from the document, as depicted in FIG. 4B. An XML parser parses the information of FIG. 4A as shown in table 56 of FIG. 4B. Once the information from the XML document shown in table 56 is parsed, a query is applied to it causing the information to be filtered 58 resulting in an output 60. The filter 58 can be implemented using SQL statements such as those depicted in FIG. 4C. Here, the customer name, address and order date fields are selected from the customer, order and payment tables. The query requires that the order date equal the payment date, the customer name equal John, the payment amount be greater than the order amount, and that the payment and order dates be equal. The result of applying this SQL query to the data produces the information shown in table 60. The intermediate tables 56 and 60 shown in FIG. 4B illustrate the amount of data that a central server must handle transiently.

Figure 5:
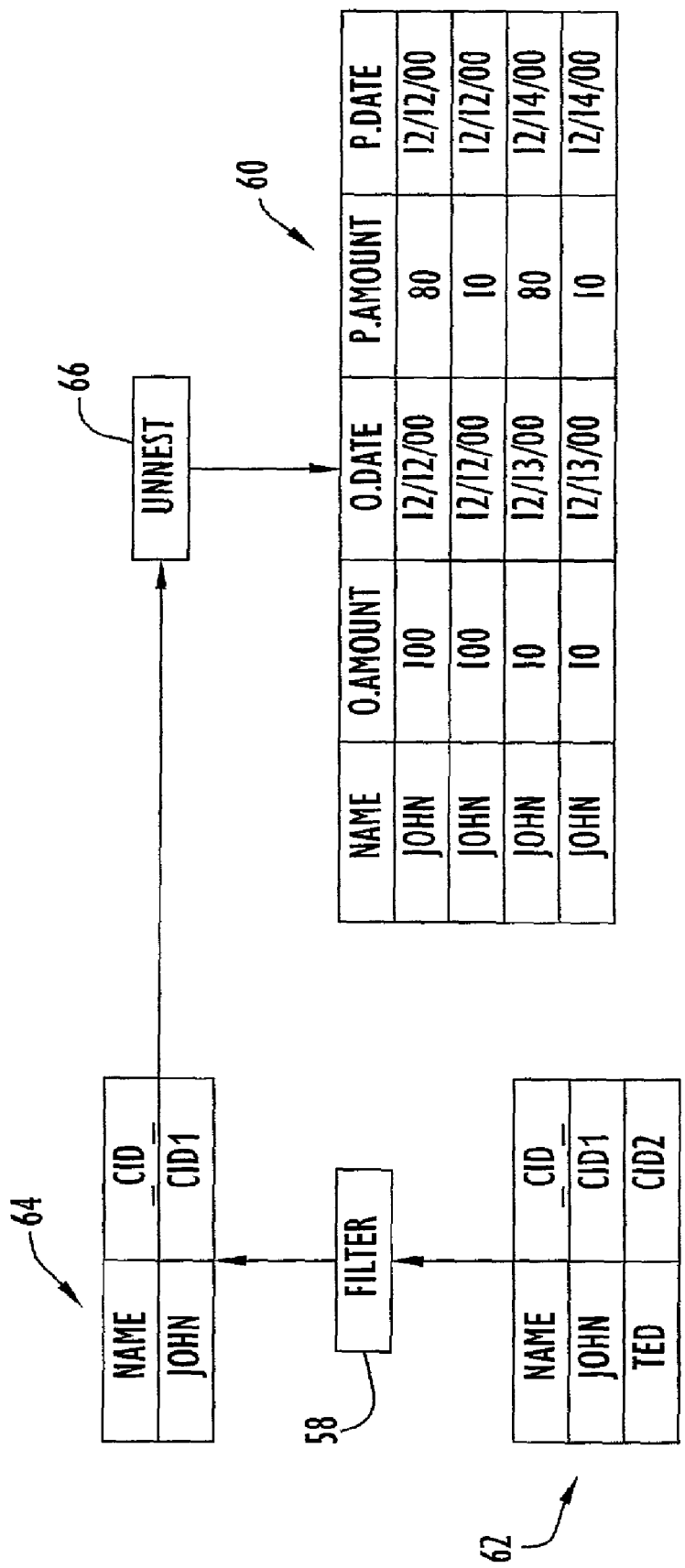
FIG. 5 illustrated a late flattening of the information in the XML document of FIG. 4A.

In the manner described above, the XML data is parsed into a single flat table and queried using conventional techniques to produce the output 60. The method described next avoids having to flatten the XML data into a single table and thereby repeat information in that table. Instead, the method operates on the XML information "on-the-fly," as a wrapper extracts it from the XML document. Here, the top level nodes within the XML document shown in FIG. 4A, namely, the customer nodes, are represented by information 62 in FIG. 5. The XML wrapper first parses only the customer nodes and outputs them to a filter 58 which evaluates one of the predicates in the SQL statement, shown in FIG. 4C, that selects only the rows for the column "John." Here, the customer nodes for John and Ted are applied to filter 58. Because the filter operates only on the customer nodes in the XML document, since those are parsed first, only the customer node for John is passed through the filter as shown by information 64. The customer node John is then unnested 66 by the wrapper to produce the table 60 shown in FIG. 5. In this manner, the XML data in the document is processed in an on-the-fly manner using a plurality of related tables to reduce the volume of data processed and without first materializing the XML information. While the end result, namely the output information 60, is the same as in the method shown in FIG. 4B, the latter method saves time and resources.

Figure 6:
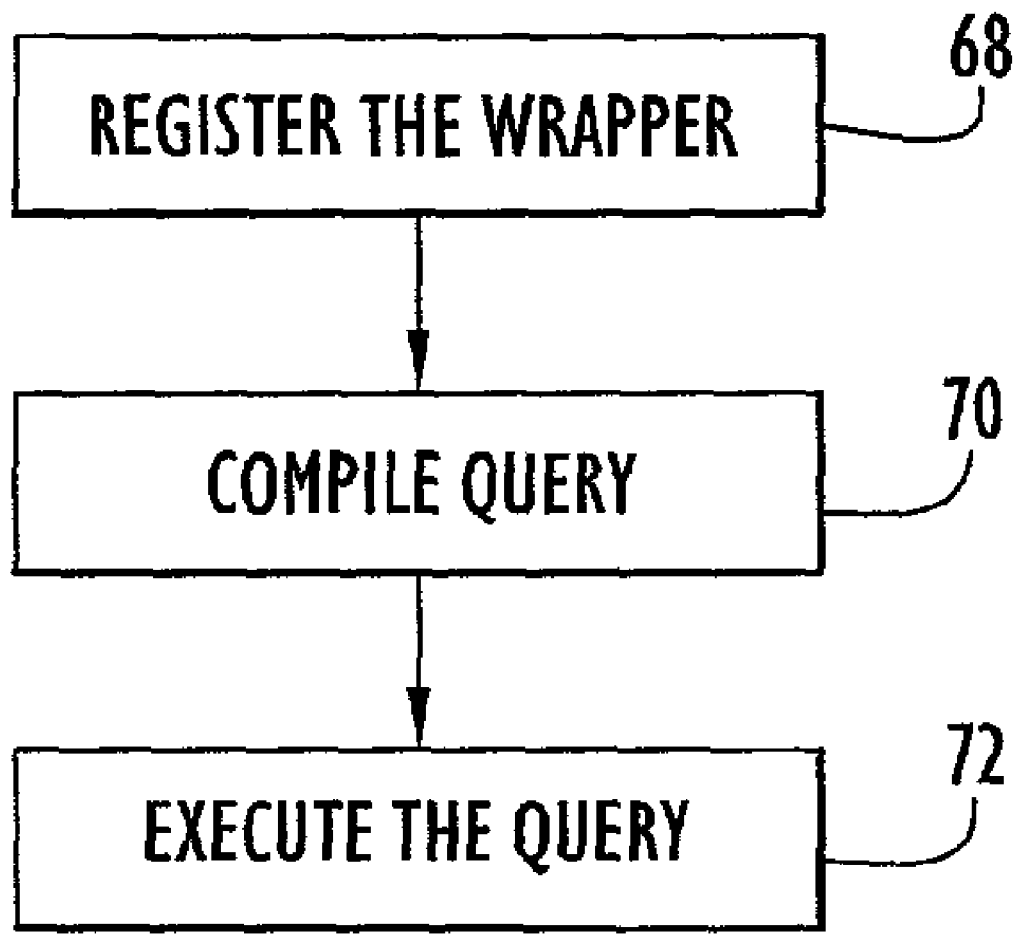
FIG. 6 is a flowchart showing a method of using an XML wrapper.

The wrapper handles three phases of processing the XML document: registration and initialization, query compilation and runtime query execution, as illustrated in FIG. 6. The wrapper is first registered 68 with the database. Queries are compiled 70 by using optimizing processes in the database to produce query fragments that are sent to the wrappers for execution. Once the queries are compiled they are executed 72 to extract selected data from the document. A description of each of these phases follows, from registration to query execution.

Registration

FIG. 7A illustrates data definition language (DDL) statements used to map the example XML document represented in FIGS. 2A and 3 into the set of four nicknames shown in FIG. 2B. The nickname definitions need to specify, 1) how to find the document elements representing individual nickname tuples; 2) how to extract the column values from those elements, and 3) where a nickname is placed in the nickname hierarchy modeling the document.

The wrapper can map the markup language document into relational tables by using a DDL syntax that uses options to provide all the needed information. FIG. 7A shows an example of a group of DDL statements, following the syntax used with the DB2® program product, that map the XML document illustrated in FIGS. 2A and 3 into the tables illustrated in FIG. 2B.

Preliminary statements in the XML wrapper DDL shown in FIG. 7A include a statement 74 that creates a wrapper called "xml" from a specified library and a statement 76 that creates an xml wrapper server called "xml_customers".

The XML wrapper DDL syntax shown in FIG. 7A includes statements for creating nickname definitions for a customer table, an order table and an items table. The payment 110 nickname definition is omitted from FIG. 7A for brevity. The customer nickname creation statement 78 creates a nickname, or table, named "customer" and introduces three column options, 80a, 80b, and 80c, and a nickname option 82.

The nickname option 82 FILE_PATH can appear only at the root nickname in the hierarchy. This option specifies the file from where the XML document is obtained. Another variant for specifying the location of the XML document is where the XML document is specified as a parameter bound to a column. The nickname XPATH option specified in statement 82 supplies the XPath expression used to identify the document elements producing tuples. Here, the statement 82 specifies the customer nickname as the root and specifies a literal file path (i.e., C:/bio_data/sequences.xml). One nickname tuple, or row, is generated for each node in the input document selected by that XPATH expression. In the example shown in FIG. 7A, for each customer node in the XML document one tuple is included in the customer nickname table. The column XPATH option, shown in statements 80a through 80c, is used to retrieve the column values to be placed in the customer table. Note that the XPath expression contained in an XPATH option is applied in a context of a tuple. For instance, the './/name' XPath expression used in statement 80a is applied to customer elements identified by the '//customer' expression in the nickname XPATH option, where '//customer' indicates all elements under the root customer element.

In an XML document, correspondence between different elements in the document is indicated by nesting elements within other elements. No keys are necessary as in the relational model. In order to map the information in an XML document into a relational schema the XML wrapper generates primary/foreign keys, based on the nesting, that relate the tuples in the nicknames produced from the same XML document. Note that these keys are not repeatable (i.e., they do not repeat over several query executions for the same elements) and cannot appear in the SELECT list of an SQL statement. Also, the wrapper is stateless, as it does not materialize data since it does not write data into the database. Therefore, it cannot generate repeatable keys.

In the example shown in FIG. 7A, keys are present in the document and they are used in the relational schema. Accordingly, every parent nickname is required to have a column defined as PRIMARY_KEY with type VARCHAR of a certain length (e.g., a length of 16). A nickname is designated as a child of another nickname by including a column that references the primary key of the parent nickname indicated with a FOREIGN_KEY option and no XPATH option. A nickname can have multiple children, although it must have exactly one parent, except for the root which has no parent. The nickname graph has a tree structure, and hence, there can be at most one PRIMARY_KEY and FOREIGN_KEY column in a nickname.

In FIG. 7A the customer nickname, or table, is created with three columns, namely, columns for NAME 80a, ADDRESS 80b, and CID 80c, where CID is the primary key for the customer table. Statement 80a defines the NAME column having a variable length of characters up to sixteen. The XPATH option expression ".//NAME" specifies that the NAME element in the XML document is located at a child of the current customer location. Similarly, statement 80b specifies the ADDRESS column having a variable length of characters up to thirty and an XPATH option expression ".//ADDR/@STREET" specifying that the ADDRESS element in the XML document is located under the current customer location. Statement 80c defines the customer identifier (CID) column with a variable length of characters, up to sixteen, with a path location at the same level as the customer location, and designated as the primary key for the customer table.

The order table is defined in a similar manner by statement 84, with statements 86a through 86d specifying four columns, namely, AMOUNT 86a, DATE 86b, OID 86c and CID-86d. The locations for these elements in the XML document are specified by the XPath expressions set forth in the options, respectively. The OID column is designated as the primary key and the CID is designated as the foreign key. Here, statement 88 specifies that the information in the XML document pertaining to orders is located at the same level as the current context and with a tag of "order." Statement 88 also specifies that a "customer" element is the parent of an "order" element.

The items nickname, or table, also is specified in a similar manner by statement 90, with statements 92a through 92c specifying three columns, namely, ITEM_NAME 92a, QUANTITY 92b, and OID 92c with their locations specified by the respective XPATH options. Here, the OID is specified as the foreign key. Statement 94 specifies that the information in the XML document pertaining to items is located at the same level as the current context and with a tag of "item," and specifies that an "order" element is the parent of an "item" element.

The DDL format for defining the root nickname where the filename is not fixed by an option value, but rather is specified in a query is shown in FIG. 7B. FIG. 7B shows query statements, including WHERE statement 100 specifying a location of the document. Here, the customer nickname creation statement 78 creates a table named "customer" and a statement 96 introduces a column that represents the document name. The nickname option DOCUMENT 96 can appear only at the root nickname in the hierarchy. One nickname tuple, or row, is generated for each element in the input document. In the example shown in FIG. 7B, for each customer node in the XML document that satisfies the query, one tuple is included in the customer nickname.

Query Compilation

Referring to FIG. 1, the database 8, upon receiving a query from an application 4, breaks the query into fragments in order to optimize the query. The database might determine that data for one or more of the query fragments resides in an external data source, such as back-end data source 10, that contains a markup language document such as an XML document. The database 8 sends a request to wrapper 14a with the query fragment intended to retrieve the desired data from data source 10. When wrapper 14a receives the request, it determines what portion, if any, of the corresponding query fragment can be satisfied by the data source. The wrapper returns a reply that describes the accepted portion of the fragment. The reply also includes cost estimates for the query, such as an estimate of the number of rows that will be produced, an estimate of the total execution time, and a wrapper plan that is an encapsulated array of the accepted portion of the fragment.

Figures 8, 9:
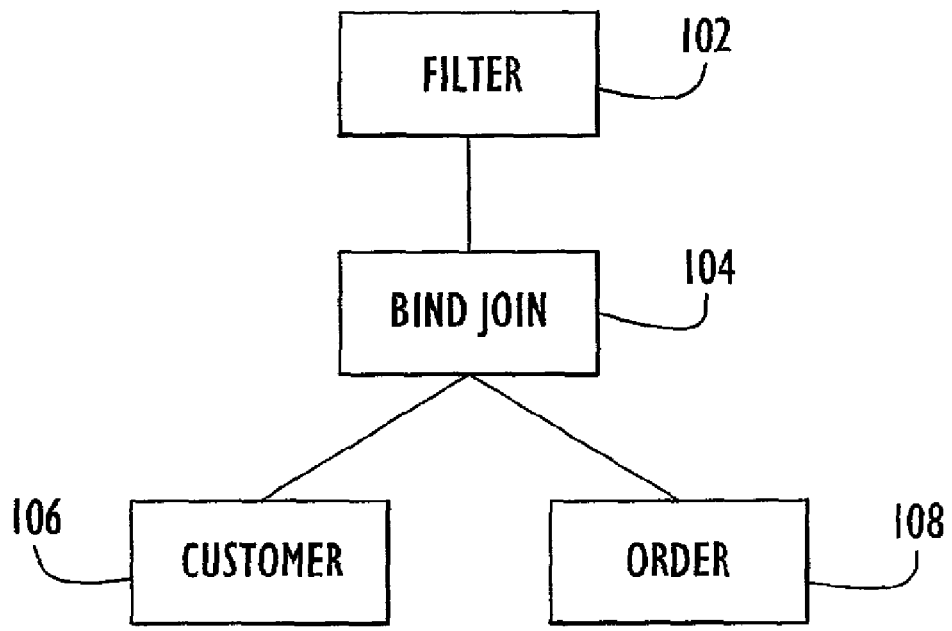
FIG. 8 is an SQL query fragment.
FIG. 9 illustrates a representation of a plan for executing the SQL query fragment of FIG. 8.

A query optimizer, incorporates the replies from the various wrappers to which it sent requests, into a global plan for the original query, introducing additional operators as necessary to compensate for portions of fragments that were not accepted by a wrapper. The cost and cardinality information from the replies is used to estimate the total cost of the plan, and the plan with minimum total cost is selected from among all the candidates. This process is referred to as a request-reply-compensate protocol. During the plan enumeration, the database sends the wrapper increasingly larger plans. The XML wrapper accepts only plans of size one, i.e. a single table access over nicknames from the XML server. For example, the plan for a simple query shown in FIG. 8 selects the amounts and customer names for each order of each customer (assuming the XML file name is specified by a FILE_PATH option). The plan produced by the optimizer is illustrated in FIG. 9, and includes a filtering process 102 following a bind join 104 of the customer table 106 and the order table 108.

The plan first selects the customer name and the CID and then performs a bind-join to get the customer orders. The bind-join models an unnest operation for the nested XML elements. If there are multiple child nicknames in a single query there will be one bind-join for each. The bind-joins in the plan do not need to make a consecutive sequence, and other operations including joins with nicknames from other sources and local tables can be interleaved. The ordering of all the operations in the query is determined by the optimizer. Bind-joins to children nicknames are always passed using the PRIMARY_KEY column of the parent nickname. The XML wrapper generates a value for this column based on an in-memory pointer of a node, such as a node in a XPath/XSLT processor such as an XALAN processor, representing the XML document element for the parent element. In the example shown in FIG. 9 a pointer to the customer element is passed to the bind-join that unnests the orders. Using this pointer, the wrapper applies the XPath expressions for extracting the orders using this node as a context. The pointer is used to directly identify the orders of the currently processed customer without another traversal through the document, and in this manner allows the information from the XML document to be processed "on-the-fly".

The wrapper returns a plan for single nickname accesses containing exactly one of the following predicates (or their symmetrical versions): dc=parameter; dc=constant, or fkc=parameter. Where dc is a DOCUMENT column and fkc is a FOREIGN_KEY column. The wrapper accepts only this predicate and the rest are evaluated by the database.

A plan is also returned for single table plans over a root nickname when there is a nickname DOCUMENT option. In this case no predicates are accepted. A request with more than one predicate of the forms listed above is due to invalid use of pseudo columns in a query and should be reported as an error. Any other predicates using the pseudo columns are also detected and an error is reported. The wrapper does not return plans for requests having the pseudo column in the select list and not in one of the accepted predicates. This forces the optimizer to generate only the bind-join plans as shown in FIG. 9.

It might happen that a pseudo column is used in an equi-join predicate compared to a column from another wrapper or local database table. The access plan in that case has a form similar to the form of the supported queries. Since such queries do not make sense, this can be detected and prevented by checking the predicates in the multi-nickname requests. While the wrapper never returns a plan for such requests, if it detects an invalid predicate it will report an error that will abort the query compilation.

The plan returned by the wrapper also contains all the columns that were in the request. Since only single nickname requests are accepted, all the columns are from that nickname. The FROM clause in FIG. 8 contains the quantifier from the request.

The database uses the reply from the wrapper to determine the query fragment that the wrapper will execute. The wrapper also prepares an execution descriptor that contains a description of the query fragment used by the wrapper at run-time. The execution descriptor is a continuous, self-contained block since as a part of the query execution plan it can be stored in the catalog or shipped to a fenced process for execution. The XML wrapper packs its internal structures into a plan array containing an entry for the nickname and one entry for each selected column. Each entry has attached an XPath expression. The column entries also carry the position in the SELECT list (output tuple) and the data type. The execution descriptor contains a flag to indicate how to obtain the context for the XPath expressions evaluation. If the plan is for a root nickname where the file name is supplied with a DOCUMENT nickname option, or the nickname had a DOCUMENT column and the file name was given as a query constant, then the file name is also added to the execution descriptor. In the case when the file name is generated by the other parts of the query and it is not available at compile time, the name is extracted from the bound-in parameter at runtime. When the descriptor represents a plan for a non-root nickname, the context is given by the bound-in value produced by the access plan for the parent nickname preceding the current access plan. The descriptor in this case indicates that the context is a memory pointer stored in the input parameter.

Run-Time

The XML wrapper can use a conventional XPath/XSLT processor, such as an XALAN processor, to process the XPath expressions. Execution of the query fragment received from the database is divided into Open, Fetch and Close phases that employ similar semantics as used with database cursors. These functions can be implemented in an object oriented class in a query gateway, such as an object class referred to here as the XML_Query class.

Figure 10:
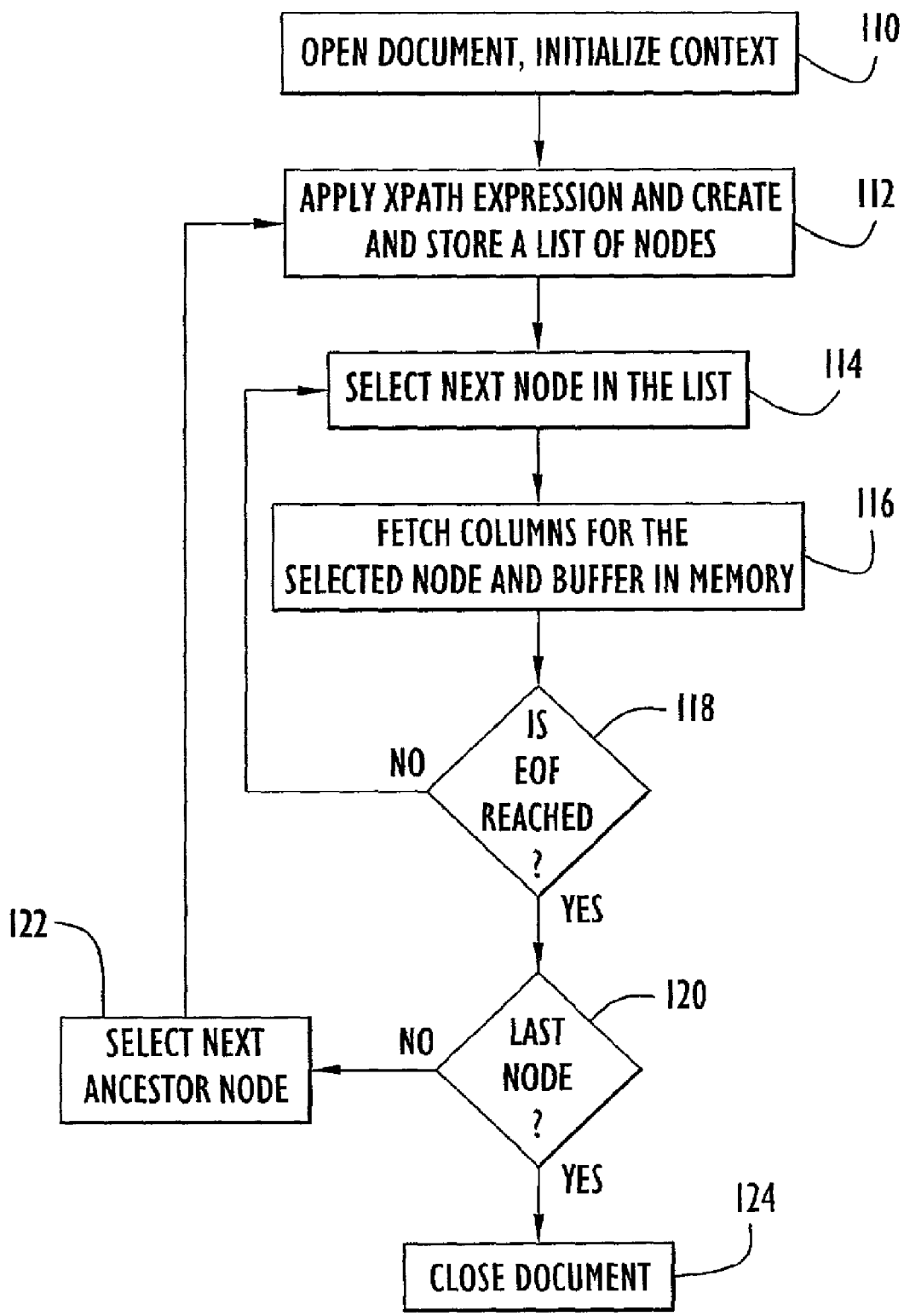
FIG. 10 is a flowchart illustrating the runtime operation of an XML wrapper.

Operation of the runtime phase is described with reference to FIG. 10. In the Open phase the wrapper unpacks the execution descriptor created during query compilation and initializes the context either by opening and parsing the file or by obtaining a supplied memory pointer 110. The pointer points to an XML_Query object of the access operator for the parent nickname. The XML_Query objects of the non-root nicknames are initialized by copying the information for the passed parent object. In this manner the parse tree is reused and access is obtained to the context by passing only one pointer between the access sub-plans.

Each time an Open is invoked with a new context, the XPath expression for the nickname is applied and the resulting list of nodes is stored in an object attached to the XML_Query object 112. The first time the document is opened, a first node is selected for processing. That first node can be selected according to certain criteria, such as the node satisfying a query. The nodes in the list are processed in order and in operation 114 the next node in the list is selected. Each consecutive invocation of a Fetch uses one object in this list to retrieve the required column values 116 and buffer those values in memory. When the end of the list is reached, Fetch returns an end of file (EOF) indication 118. If an EOF indication is not returned 118, the next node in the list is selected for unnesting 114. If an EOF indication is returned but the node is not the last node 120, the next ancestor node is selected 122 and the XPath expression applied to that node 112. This causes one of the preceding access operators representing ancestor nicknames in the hierarchy to move to the next node in their list and call the child with a new context. When the last node is processed 120, the document is closed 124. In operation 122, the next ancestor node that is selected can be qualified by certain criteria, such as the node satisfying a query. This qualification of a node can be performed by the database management system. In this manner, only the nodes satisfying a query, or meeting some other criteria, are unnested.

For example, for the query shown in FIG. 8, during opening of the plan segment for the order nickname the '//customer' XPath is applied and the resulting list of customer nodes is stored. The context index is set to point to the first of the retrieved nodes (the first customer node) and is also stored in the XML_Query object.

The Fetch function returns the required columns, including the pseudo column containing the pointer to the current XML_Query object. Next, the system opens the inner operand of the nested loop join by calling the Open function on the XML_Query object representing the order nickname access plan. Here, the first node (identified by the list and the current context index being 0) in the list of the passed XML_Query object is used as a context to apply the '//order' XPath expression retrieving a set of orders for the first customer. Here again, the resulting list is stored in the current XML_Query object together with context index set to 0. A subsequent Fetch invocation returns the tuples of columns for the first customer orders by applying the XPath expressions for the columns to the nodes in the list. When the Fetch for the order table returns EOF, the next customer is fetched and the process continues until all the orders for all the customers are processed. Finally, Close deletes the node lists and other intermediate storage.

Views and Rewrites

As described so far the XML wrapper supports only queries that have a join over the PRIMARY_KEY and FOREIGN_KEY columns. A query over nicknames from the same hierarchy that does not contain the correct set of joins cannot be processed. While the joins over the primary/foreign keys are the most common ones, in certain situations other joins might be required. One such example is when the XML document contains keys that relate the elements in addition to the nesting. For convenience, or if the queries are already written, the joins might be expressed over these logical keys. Logical keys cannot be used without some auxiliary structures as indexes to locate the corresponding input document tree nodes. In a federated environment, indexes for data from external sources are not available, and therefore, queries over the logical keys need to be augmented with predicates that join the nicknames using the pseudo columns that, during the execution, contain physical keys, e.g., memory pointers. This applies to all other queries that join nicknames over non-key data or join pieces of the nickname hierarchy that does not start at the root of the hierarchy.

To allow any type of query, the user can define federated views, on top of the nicknames, that will guarantee the inclusion of the required predicates and a full path to the root. The technique described below uses existing DB2® rewrite rules to add the required predicates while in most cases the redundancies are eliminated by existing DB2® rewrite rules.

Such views, for orders, payments and items, are shown in FIG. 11. These views are defined for each non-root nickname as a join of all the nicknames on the path to the root. The join predicates are over the PRIMARY_KEY and FOREIGN_KEY columns, and the SELECT list contains all the columns of the nickname. In the case where the XML document contains keys, the pseudo columns can be omitted from the list. In the view definitions the primary key column is defined by selecting the parent nickname's PRIMARY_KEY.

To illustrate the use of such views assume that the nicknames in the example shown in FIG. 11 are declared as customer, order_i, payment_i and item_i. Exemplary views for orders 126, payments 128, and items 130 are shown in FIG. 11. The order view 126 selects the order amount, order date, order ID (OID) and customer ID (CID) from the customer and order_i tables related by the CID key. The payment view 128 selects the payment amount, payment date and customer ID from the customer and payment_i tables, related by the CID key. The item view 130 selects the item quantity, item name and order ID from the customer, order_i and item_i tables, related by the CID and OID keys.

A query submitted against any of the views shown in FIG. 11 is processed correctly since the join path to the root is present once the view is expanded. An example of such a query is a query that pairs the amounts of customer's orders and payments having the same date, as shown in FIG. 12A.

If order and payment are XML wrapper nicknames the query will not execute since no plan can be produced without the customer nickname in the query. However, if the query is evaluated over the views shown in FIG. 11, the views first will be expanded into the query segment shown in FIG. 12B. During the database rewrites, performed in this example by DB2®, the query rewrite deduces c1.cid=c2.cid and based on the uniqueness of the customer CID column c1=c2. Accordingly, the database rewrites the query as shown in FIG. 12C, and this query is accepted by the wrapper.

Similarly, the query shown in FIG. 13A is expanded into the query shown in FIG. 13B. This query is finally rewritten into the form shown in FIG. 12C, where the redundancy is eliminated.

The wrapper can be enhanced to create these views through use of a mapping tool.

Applications

Another example of an application of the XML wrapper described here is depicted with reference to FIGS. 14A through 14D, concerning a life sciences application. Here, an XML document, a portion of which is shown in FIG. 14A, includes DNA sequences with DNA codes and associated comments to those codes. As shown in FIG. 14A an XML tag 132 identifies the beginning of a sequence. In the sequence are DNA codes 134a and 134b. Also in sequence are comment statements 136a and 136b that contain information concerning the codes. An end tag 138 marks the end of the sequence.

An SQL query to process this XML document is shown in FIG. 14B. Here, a code and comment are selected from the sequence and comment tables in which a relatively expensive operation, namely a match operation, is performed on the XML document. A conventional method for processing the SQL query is illustrated in FIG. 14C. Referring to FIG. 14C, the information contained in the XML document is first extracted into a table 140. In this manner the XML information is flattened so that a tuple, or row, for each code and corresponding comment is included in the table 140. The match operation 142 then operates on the flattened table 140 to produce the desired results 144. However, the expensive match operation must operate on each tuple in table 140, namely, on each of the codes and comments in the XML document, resulting in a expensive operation.

The XML wrapper described here can be used to reduce the expense of the operation. Referring to FIG. 14D, the information in the XML document is processed on-the-fly to thereby reduce the number of matches performed. Only the separate codes in the XML document, and not duplicated codes, are extracted and the match performed only on those extracted codes. As shown in FIG. 14D the XML information for the codes "AGTGA . . ." and "TGAGA . . ." are extracted from the XML document and matched using the match operation 142. The XML document output 146 includes the code ID, namely code ID1 and code ID2, corresponding to the two codes that are extracted from the document. These code IDs are set forth in the comment column of the tables shown in FIG. 14D. Applying the match operation to the two codes results in one of the codes being matched, namely, the code "AGTGA . . . ." The unnest operation 150 is then performed only on that matched code resulting in the information 144 being output. In this manner the number of match operations is minimized so that the match operation is only applied once to each unique code within the XML document thereby reducing the expense of the match operation.

Having described systems, articles of manufacture and methods of handling information contained in a markup language document using database tools and techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A computer based system for querying a markup language document having hierarchical information including a parent node and descendent nodes related to the parent node, comprising:
   a data source having stored therein a markup language document; and
   a wrapper unit configured to retrieve the markup language document, identify and extract information from the retrieved markup language document in response to a query by consulting a mapping specification containing information for locating the parent node, and if the parent node satisfies the query to store the parent node in a first table, and to locate the descendent nodes by consulting the mapping specification if the parent node satisfies the query and store said descendent nodes in a second table.

2. The computer based system of claim 1, wherein said consulting a mapping specification includes evaluating an expression for locating the parent node.

3. The computer based system of claim 2, wherein the document is an Extensible Markup Language (XML) document and the expression is an XPath expression.

4. The computer based system of claim 3, wherein the mapping specification contains a data definition language statement with an option specifying the XPath expression.

5. The computer based system of claim 4, wherein the query is a Structured Query Language (SQL) query.

6. The computer based system of claims 1, wherein the wrapper identifies repeating elements in the markup language document.

7. The computer based system of claims 1, wherein the wrapper identifies elements with distinct identity in the markup language document.

8. A computer implemented method for querying a markup language document having hierarchical information including a parent node and descendent nodes related to the parent node, comprising:
   storing, in a data source, a markup language document;
   retrieving the markup language document;
   identifying and extracting information from the retrieved markup language document in response to a query by consulting a mapping specification containing information for locating the parent node, and if the parent node satisfies the query, storing the parent node in a first table; and
   locating the descendent nodes by consulting the mapping specification if the parent node satisfies the query and storing said descendent nodes in a second table.

9. The computer implemented method of claim 8, wherein said consulting a mapping specification includes evaluating an expression for locating the parent node.

10. The computer implemented method of claim 9, wherein the document is an Extensible Markup Language (XML) document and the expression is an XPath expression.

11. The computer implemented method of claim 10, wherein the mapping specification contains a data definition language statement with an option specifying the XPath expression.

12. The computer implemented method of claim 11, wherein the query is a Structured Query Language (SQL) query.

13. The computer implemented method of claims 8, wherein the identifying includes identifying repeating elements in the markup language document.

14. The computer implemented method of claims 8, wherein the identifying includes identifying elements with distinct identity in the markup language document.

15. A computer readable medium having stored thereon a method for querying a markup language document having hierarchical information including a parent node and descendent nodes related to the parent node, comprising:

storing, in a data source, a markup language document;

retrieving the markup language document;

identifying and extracting information from the retrieved markup language document in response to a query by consulting a mapping specification containing information for locating the parent node, and if the parent node satisfies the query, storing the parent node in a first table; and locating the descendent nodes by consulting the mapping specification if the parent node satisfies the query and storing said descendent nodes in a second table.

16. The method of claim 15, wherein said consulting a mapping specification includes evaluating an expression for locating the parent node.

17. The method of claim 16, wherein the document is an Extensible Markup Language (XML) document and the expression is an XPath expression.

18. The method of claim 17, wherein the mapping specification contains a data definition language statement with an option specifying the XPath expression.

19. The method of claim 18, wherein the query is a Structured Query Language (SQL) query.

20. The method of claims 15, wherein the identifying includes identifying repeating elements in the markup language document.

21. The method of claims 15, wherein the identifying includes identifying elements with distinct identity in the markup language document.

* * * * *